United States Patent
Jefferies

[15] 3,688,089
[45] Aug. 29, 1972

[54] TDS SLIDE RULE

[72] Inventor: Jesse H. Jefferies, 5706 Burlinghall Dr., Houston, Tex. 77035

[22] Filed: Feb. 22, 1971

[21] Appl. No.: 117,276

[52] U.S. Cl. ................................ 235/88, 235/61 V
[51] Int. Cl. .......................................... G06c 3/00
[58] Field of Search .....235/84, 61 B, 61 S, 88, 70 A, 235/61 V, 78; 33/1 C, 76 VA, 76 R

[56] References Cited

UNITED STATES PATENTS

| | | | |
|---|---|---|---|
| 3,127,102 | 3/1964 | Fallis | 235/61 B |
| 3,282,501 | 11/1966 | Copeland | 235/61 NV |
| 3,373,932 | 3/1968 | Copeland | 235/61 NV |

*Primary Examiner*—Richard B. Wilkinson
*Attorney*—Michael P. Breston

[57] ABSTRACT

This invention relates to a circular slide rule which is particularly adapted for making time-distance-speed computations such as are required for TDS rallies. The slide rule includes a bottom disc, a top disc, and an indicator, all coaxially mounted for relative rotation. A cursor is slidably mounted on the indicator. A radially extending hairline on the indicator reads off the numbers on a scale disposed on the bottom disc. A transverse hairline on the cursor reads off the numbers on a scale disposed on the indicator, and the cross hair point reads off the numbers on a scale arranged on the top disc.

9 Claims, 2 Drawing Figures

PATENTED AUG 29 1972     3,688,089

Jesse H. Jefferies
INVENTOR.

BY Michael P. Breston

TDS SLIDE RULE

BACKGROUND OF THE INVENTION

International time-distance-speed (TDS) motor rallies are becoming more and more popular. In TDS rallies the car is driven over a more or less complicated course which is unknown until the start of the run. The object of the rally is to maintain specified average speeds between check points. Ordinarily each car is driven by a team consisting of a driver and navigator who follows the directions provided for the route and calculates the TDS parameters needed to successfully complete the rally.

In the early days of TDS rallies, the navigator had to perform all of the TDS calculations either mentally or with a pencil and paper. Then, special tables were compiled to eliminate some of the drudgery of these calculations. As the sport progressed, straight and circular slide rules were introduced. While some of the known TDS slide rules were faster to use than existing tables, they lacked accuracy and a sufficient number of scales. As a result, the navigator had to still carry out numerous auxiliary computations which were tedious, time consuming and subject to frequent errors.

Accordingly, it is a main object of this invention to provide a new and improved rally TDS slide rule which is preferably circular in form. The disposition of the various scales on the members of the slide rule is such that their interrelationship can be easily comprehended by the navigator.

It is another object of this invention to provide such a circular TDS slide rule which allows speed of operation, which provides flexibility in solving many TDS problems, and which can be preset to automatically correct for odometer deviations from a given standard odometer reading.

It is a further object of this invention to provide a new and improved circular slide rule which can yield continuous solutions without the need to make intermediate readings and recordings thereof.

SUMMARY OF THE INVENTION

The TDS slide rule of this invention includes at least two discs and one indicator all stacked in coaxial relationship for relative movement therebetween. The bottom disc has a relatively large diameter and bears near its outer periphery a circular time scale which is divided into equal time increments. The top disc bears an odometer scale which can be used for different speeds. The indicator is provided with a hairline which extends in a radial direction over the time scale to read off time as it rotates relative to the discs. A speed scale is disposed on the indicator parallel to the time hairline. A cursor is slidably mounted for up and down movement on the indicator. A hairline on the cursor is disposed perpendicular to the time hairline and is adapted to read off speed numbers.

After the slide rule is adjusted for initial readings, the indicator is periodically rotated to follow elapsed time relative to the top and bottom discs which are maintained stationary. For any particular time, the desired odometer reading can be obtained by reading off the number on the odometer scale underlying the cross hair point.

In a preferred embodiment of this invention, the circular scale on the bottom disc is divided into three equal scales. The speed scale is a logarithmic scale, that is it is divided into lengths which are proportional to the logarithms of the numbers indicated on the speed scale. The odometer scale includes a plurality of lines wherein each line constitutes the locus of equal numbers for different speed values.

Figures 1, 2:
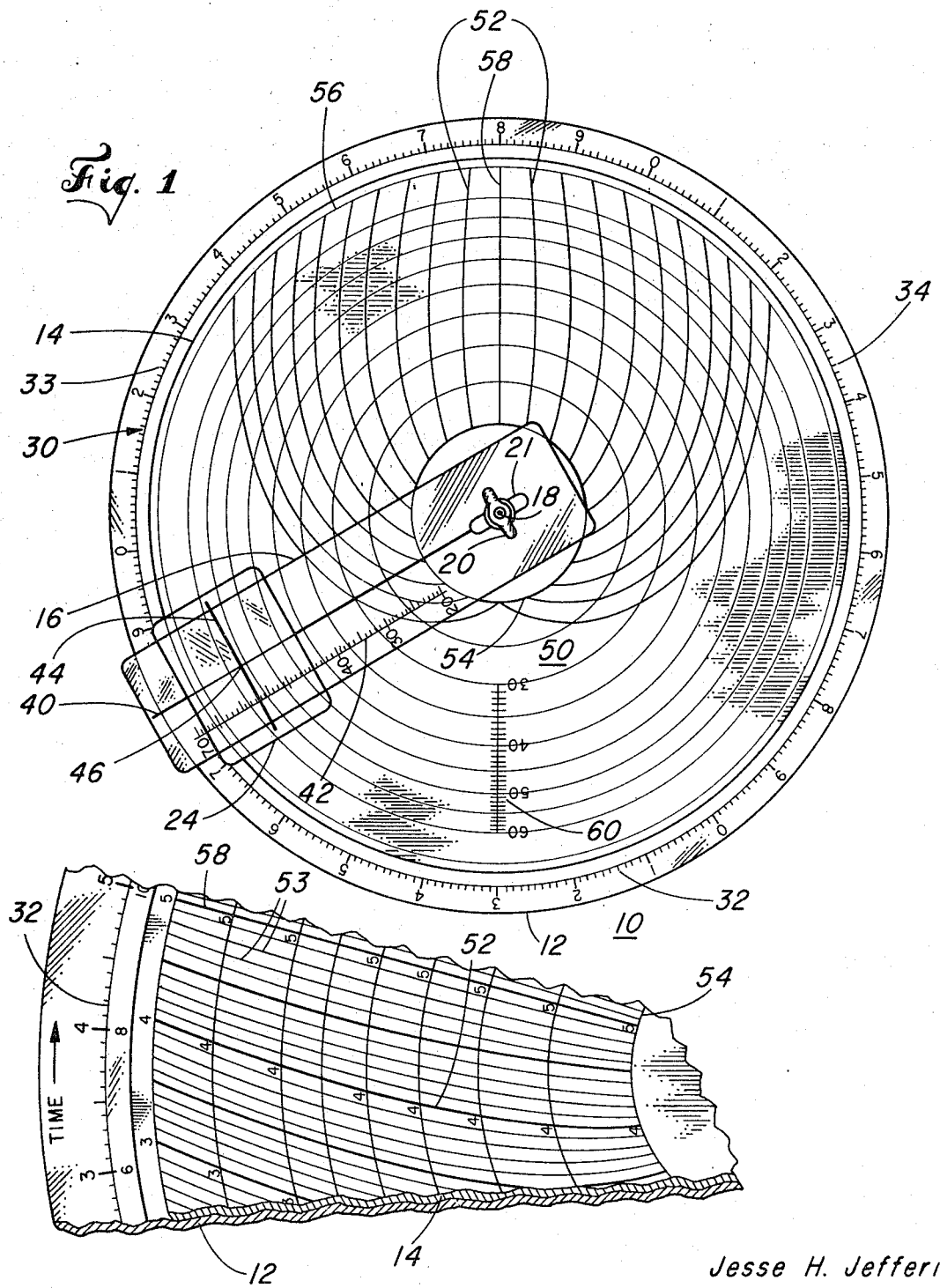
FIG. 1 is a schematic top view of a preferred embodiment of the circular slide rule of this invention.
FIG. 2 is an enlarged view of a portion of the slide rule shown in FIG. 1.

Referring now to the drawings, the TDS slide rule of this invention is generally referenced as 10. Although in the drawings and in the description that follows, slide rule 10 is represented as being circular, it will be apparent that it can be straight. The circular form has definite advantages over the straight form, since elapsed time can be easier followed around the clock on a circular scale.

Slide rule 10 includes a bottom disc 12, a top disc 14, and an indicator 16, all stacked in coaxial relationship for relative rotation on a stub shaft 18 to which they are detachably secured by a wing nut 20. The diameter of disc 12 is slightly larger than that of top disc 14. Indicator 16 has a generally rectangular configuration and has a longitudinal slot 21 to allow the indicator to become displaced in a radial direction outwardly or inwardly prior to securing the indicator by tightening wing nut 20. Slidably mounted for up and down movement on indicator 16 is a cursor 24. To be able to read off points from the scales on the top and bottom discs, both indicator 16 and cursor 24 are made of a transparent plastic material.

Inscribed near the outer edge of bottom disc 12 is a circle, generally designated as 30. Circle 30 is divided into three equal length arcs 32, 33 and 34. Each arc is divided into ten equal increments of time ranging from 0, 1, 2 . . . 9, 0. The numbers progress clockwise and each 0 marking is both the beginning of one time scale and the end of the immediately preceding time scale. On the indicator 16 is a radially extending hairline 40 which is sufficiently long to read off numbers on circle 30. Hairline 40 is herein called the "time" hairline. Disposed parallel to and along side of hairline 40 is a logarithmic speed scale 42 which is divided into length units that are proportional to the logarithms of the numbers indicated on the speed scale.

On the face of the cursor 24 is inscribed a "speed" hairline 44 which is perpendicular to the time hairline 40. The point of intersection 46 between hairlines 40 and 44 is the cross hair point (CHP) which is used to read out numbers from the odometer scale.

The odometer scale is generally designated as 50 and includes a plurality of spiraling lines 52 emanating from an inner circle 54 and terminating in an outer circle 56. Each odometer line 52 constitutes the locus of equal numbers for different speed values. The construction of the odometer scale 50 can vary, but it is convenient to start from a center line 58 which is in a radial direction. For a particular speed value and time value a point can be obtained on the odometer scale relative to the center line 58. Thus, each line 52 is constructed by joining equal-numbered points, and each line 53 is constructed by joining equal decimals thereof. In sum, given the time scale and the speed scale, the points necessary to construct the odometer scale can be easily obtained.

Inscribed on the top disc 14 is a logarithmic correct distance scale 60 disposed in a radial direction. Scale 60 is used to make odometer corrections in a manner subsequently described. Although slide rule 10 of this invention can be used for any TDS computations, its operation will now be illustrated in connection with typical numbers encountered in a TDS rally.

Before the slide rule can be used, it must be preset to the initial conditions. The slide rule is set by using clock time in minutes and decimal fractions thereof, by using distance in miles and decimal fractions thereof, and by using speed in miles per hour and decimal fractions thereof. The odometer readings are obtained from the odometer on the car being driven and the time readings from a suitable clock.

In operation, assume that the starting speed will be 60 mph. Set the speed hairline 44 on number 60 on the speed scale 42. Turn the indicator 16 so that its time hairline 40 lines up with the correct distance scale 60. If number 60 on the correct distance scale does not fall under the CHP 46, indicator 16 must be properly adjusted. Loosen wing nut 20 and move indicator 16 inwardly or outwardly until number 60 on the correct distance scale lies under the CHP 46. Retighten the wing nut to lock indicator 16.

Assume that the rallyist will leave a check point on the route at 12:01.00 at 60 mph and that the car's odometer reads 12,892.73. The navigator will use 1.00 for the time scale and 2.73 for the odometer scale.

Set the speed hairline 44 on number 60 on the speed scale 42 and turn the indicator until its time hairline 40 lines up with the number 1.00 on the time scale. Lock the indicator 16 to the bottom disc 12 with the aid of a suitable clamp (not shown).

Turn the top disc 14 until 2.73 on the odometer scale falls under the CHP. Now clamp the top and bottom discs 12 and 14 together and unclamp indicator 16.

The slide rule is now preset with the initial conditions and ready for use.

The driver departs when the clock shows 12:01.00. As time passes, say from 1.00 to 1.50 minutes, the navigator rotates indicator 16 clockwise to number 1.50 on the time scale and reads 3.23 on the odometer scale under the CHP. Thus the desired odometer reading is 3.23. If the car's odometer reading is then less or greater than the desired odometer reading, the navigator instructs the driver to either speed up or slow down. Most navigators check their position approximately every minute.

Assume now that the instructions call for changing speed from 60 to 40 mph at a specified landmark. If the driver reaches the specified landmark when the car's odometer reads 8.80, then the navigator moves the CHP over the 8.80 number on the odometer scale. The time reading 7.07 from the time scale is the official time the car should have reached the specified landmark.

To reset the slide rule, the number 7.07 on the time scale is moved under hairline 40. The bottom disc 12 and indicator 16 are clamped together. The cursor 24 is moved inwardly along slot 21 so that the speed hairline is over number 40 on the speed scale. Unclamp the top disc from the bottom disc and move the top disc until number 8.80 is again under the CHP. Clamp top disc 12 to bottom disc 14 and unclamp indicator 16. The slide rule is now reset for 40 mph speed starting with an odometer reading of 8.80 miles at the prescribed time 7.07.

Thereafter, indicator 16 is again rotated clockwise to follow elapsed time. If an odometer check is again desired when the clock reads 12:07.82, that is at 7.82 minutes, turn the indicator clockwise so that number 7.82 on the time scale is under the time hairline 40. Read out the number 9.30 on the odometer scale under the CHP. If the car's odometer reads less or more than 9.30, the driver will accelerate or slow down. As the navigator rotates the indicator in a clockwise direction, the CHP will reach the 10 mile line 52 on the odometer scale.

To reset the odometer scale, turn the indicator until the CHP is exactly over number 10 on the odometer scale. Lock the indicator to the bottom disc 12, unlock the top disc 14 and turn the top disc until the CHP is over the 0 line on the odometer scale. Relock top disc 14 to the bottom disc 12. Unclamp indicator 16 and turn it clockwise to follow elapsed time in the manner previously described.

With the slide rule of this invention, odometer error corrections can be easily accomplished. All TDS rallies include an odometer check run performed by an official car. If the odometer in the official car reads 60 miles and the rallyist's odometer reads 63 then his odometer is 5 percent in error. Position the speed hairline on number 63 on the speed scale and turn the indicator to cause the time hairline to line up with the correct distance scale 60. Loosen wing nut 20, move indicator 16 up or down until number 60 on the correct distance scale is under the CHP, and relock wing nut 20. The slide rule is now set to automatically compensate for the 5 percent error in the rallyist's odometer reading.

It will be appreciated that the preceding explanation of a typical mode of operation of the circular TDS slide rule of this invention is given for illustrative purposes only. More scales can be provided if desired. Another speed scale can be disposed parallel to speed scale 42 for speed values in a lower range. Similarly a faster time scale can be arranged on a circle concentric with circle 30. The operation of the slide rule with these extra scales would be the same as that previously described. Accordingly, it is not desired to be limited by the specific examples and scale arrangements above described.

The slide rule of this invention can be readily adapted to other fields to perform calculations similar to those described. It is intended that all such modifications fall within the scope of the claims attached hereto.

What I claim is:

1. A circular slide rule comprising:
   a bottom disc, a top disc, and an indicator,
     said top disc, said bottom disc and said indicator being coaxially mounted for relative rotation;
   a cursor slidably mounted on said indicator;
   a first scale on said bottom disc;
   a second scale on said top disc;
   a radially-extending hairline on said indicator;

a third scale on said indicator disposed in parallel relationship with said radially extending hairline;

a transverse hairline on said cursor;

said radially extending hairline and said transverse hairline intersecting to provide a cross hair point;

said radially extending hairline reading off numbers on said first scale;

said cross hair point reading off numbers on said first scale; and said indicator being provided with a radially extending slot whereby said indicator is movable in a radial direction relative to said top disc.

2. The slide rule of claim 1 wherein, said bottom disc, said top disc, and said indicator are mounted on a center shaft.

3. The slide rule of claim 2 wherein said top scale is provided with a radially extending reference scale; and the radial position of said cursor on said indicator is referenced to said reference scale.

4. The slide rule of claim 3 wherein said first scale includes at least one time scale, said second scale is a distance scale, said third scale is a speed scale, said distance scale includes a plurality of spiralling lines, each line representing the locus of equal numbered points on said second scale, and said speed scale is a logarithmic scale.

5. The slide rule of claim 1 wherein said first scale includes at least one time scale.

6. The slide rule of claim 5 wherein said second scale is a distance scale.

7. The slide rule of claim 6 wherein said third scale is a speed scale.

8. The slide rule of claim 7 wherein said speed scale is a logarithmic scale.

9. The slide rule of claim 6 wherein said distance scale includes a plurality of spiralling lines, each line representing the locus of equal numbered points on said second scale.

* * * * *